United States Patent [19]

Joyce

[11] Patent Number: 5,690,307
[45] Date of Patent: Nov. 25, 1997

[54] VEHICLE ACCESSORY HOLDER WITH A GOOSENECK SHAFT

[76] Inventor: William Edmund Joyce, 6057 Dunrobin, Lakewood, Calif. 90713

[21] Appl. No.: 605,720

[22] Filed: Feb. 22, 1996

[51] Int. Cl.$^6$ ............................................. E04G 3/00
[52] U.S. Cl. .......................... 248/274.1; 248/205.2; 248/311.2; 248/634
[58] Field of Search ...................... 248/205.2, 274.1, 248/311.2, 632, 633, 634

[56] References Cited

U.S. PATENT DOCUMENTS

| | | | |
|---|---|---|---|
| D. 331,045 | 11/1992 | Moerke | D14/114 |
| 1,419,293 | 6/1922 | Myers | 248/632 |
| 3,362,666 | 1/1968 | O'Donnell | 248/633 |
| 3,399,103 | 8/1968 | Salyer et al. | 248/633 X |
| 4,842,174 | 6/1989 | Sheppard et al. | 248/535 X |
| 4,887,788 | 12/1989 | Fischer et al. | 248/632 X |
| 4,909,473 | 3/1990 | Korinek et al. | 248/632 X |
| 5,031,873 | 7/1991 | Rau | 248/632 |
| 5,370,241 | 12/1994 | Silvers | 248/205.2 X |
| 5,509,633 | 4/1996 | Ruster et al. | 248/311.2 |
| 5,511,755 | 4/1996 | Spykerman | 248/311.2 |
| 5,515,573 | 5/1996 | Frey | 248/205.2 X |

*Primary Examiner*—Alvin C. Chin-Shue
*Assistant Examiner*—Richard M. Smith

[57] ABSTRACT

A vehicle accessory holder with a gooseneck shaft adapted for use in association with a vehicle having a passenger cab with a floor board and at least one accessory item, the apparatus comprising: a gooseneck shaft formed in an elongated generally cylindrical configuration with an upper end and a lower end, the gooseneck shaft being semirigid and flexible to permit maneuvering of the shaft within the cab of a vehicle, upper and lower mounting brackets being coupled to the upper and lower ends of the shaft; a lower semirigid shock absorbing plate being coupled to the upper mounting bracket; a ridged upper mounting plate being coupled to the lower semirigid shock absorbing plate; and a plurality of hook and loop coupling strips, at least one strip being adhesively coupled to the rigid upper mounting plate, each accessory item including at least one strip being adhesively coupled thereto, in an operative orientation an accessory being coupled upon the upper rigid plate with the hook and loop coupling strips being coupled together to retain the accessory upon the upper plate.

1 Claim, 3 Drawing Sheets

VEHICLE ACCESSORY HOLDER WITH A GOOSENECK SHAFT

BACKGROUND OF THE INVENTION

1. Field of the Invention

The present invention relates to a vehicle accessory holder with a gooseneck shaft and more particularly pertains to maneuvering the gooseneck shaft of the apparatus to position a vehicle accessory in a desired location.

2. Description of the Prior Art

The use of holders for use in vehicles is known in the prior art. More specifically, holders for use in vehicles heretofore devised and utilized for the purpose of retaining various items are known to consist basically of familiar, expected, and obvious structural configurations, notwithstanding the myriad of designs encompassed by the crowded prior art which has been developed for the fulfillment of countless objectives and requirements.

By way of example, the prior art discloses in U.S. Pat. No. 5,305,381 to Wang et al. a cradle for telephone.

U.S. Pat. No. 5,149,032 to Jones et al. discloses a universal cup holder for use in vehicles.

U.S. Pat. No. Des. 282,011 to Fackert discloses a gooseneck lamp.

U.S. Pat. No. 5,279,489 to Wheelock et al. discloses a floor mounted container holder assembly for a vehicle.

U.S. Pat. No. 5,205,525 to Peck discloses a cup holder for vehicles.

U.S. Pat. No. Des. 320,992 to Jondelius discloses a mounting bracket for a telephone hinge set to be mounted upon a dashboard of a motor vehicle or the like.

In this respect, the vehicle accessory holder with a gooseneck shaft according to the present invention substantially departs from the conventional concepts and designs of the prior art, and in doing so provides an apparatus primarily developed for the purpose of maneuvering the gooseneck shaft of the apparatus to position a vehicle accessory in a desired location.

Therefore, it can be appreciated that there exists a continuing need for a new and improved vehicle accessory holder with a gooseneck shaft which can be used for maneuvering the gooseneck shaft of the apparatus to position a vehicle accessory in a desired location. In this regard, the present invention substantially fulfills this need.

SUMMARY OF THE INVENTION

In view of the foregoing disadvantages inherent in the known types of holders for use in vehicles now present in the prior art, the present invention provides an improved vehicle accessory holder with a gooseneck shaft. As such, the general purpose of the present invention, which will be described subsequently in greater detail, is to provide a new and improved vehicle accessory holder with a gooseneck shaft and method which has all the advantages of the prior art and none of the disadvantages.

To attain this, the present invention essentially comprises a new and improved vehicle accessory holder with gooseneck shaft adapted for use in association with a vehicle having a passenger cab with a floor board and at least one accessory item, the apparatus comprising, in combination: a gooseneck shaft formed in an elongated generally cylindrical configuration with an upper end, a lower end and a central extent therebetween, the upper and lower ends of the shaft being solid, the central extent being formed as a plurality of continuously formed coils, the gooseneck shaft being semirigid and flexible to permit maneuvering of the shaft to various locations within the cab of a vehicle; upper and lower mounting brackets each including a cylindrical coupling member and a circular shaped base member with a plurality of bolt holes, the lower mounting bracket adapted to be coupled to the floor board of a vehicle with a plurality of bolts, the lower end of the gooseneck shaft being coupled within the lower mounting bracket, the upper bracket being coupled to the upper end of the gooseneck shaft; a lower semirigid shock absorbing plate formed in a planar generally rectangular configuration with a plurality of centrally positioned bolt holes, the plate having an upper surface including cylindrical bolt supports with internal bolt threads, the bolt supports being positioned around the bolt holes, a plurality of bolts coupling the lower plate to the upper mounting bracket; a central semirigid shock absorbing plate formed in a planar generally rectangular configuration with a greater thickness than the lower semirigid plate, the central semirigid plate having a plurality of centrally positioned bolt holes extending therethrough, the central plate being positioned upon the upper surface of the lower plate such that the bolt supports thereof extend through the central plate; a rigid upper mounting plate formed in a planer generally rectangular configuration with an upper surface and a lower surface, a plurality of bolts being positioned through the lower and central semirigid plates and being coupled within the lower surface of the rigid upper mounting plate, the plates being coupled together to permit shock absorption; a plurality of hook and loop coupling strips, at least one strip being adhesively coupled to the upper surface of the rigid mounting plate, each accessory item including at least one strip being adhesively coupled thereto, in an operative orientation an accessory being coupled upon the upper rigid mounting plate with the hook and loop coupling strips being coupled together to retain the accessory upon the upper plate; a cup holder formed in a generally rectangular configuration with an upper surface and a lower surface, the upper surface including two generally cylindrical shaped recesses extending therein, in an operative orientation the cup holder having at least one hook and loop coupling strip affixed to the lower surface and couplable to the upper plate of the apparatus, the cup holder adapted to hold accessories such as beverage cups in an operative orientation; and an electronic device holder formed in a generally rectangular configuration with an upper surface and a lower surface, the upper surface including a generally rectangular shaped recess extending therein, the electronic device holder having a first side edge including a semicircular recess positioned therein to permit the passage of an electronic device electrical plug therethrough, in an operative orientation the electronic device holder including at least one hook and loop coupling strip affixed to the lower surface and couplable to the upper rigid plate of the apparatus, the electronic device holder adapted to securely retain a plurality of different types of electronic vehicle accessories.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved vehicle accessory holder with a gooseneck shaft which has all of the advantages of the prior art holders for use in vehicles and none of the disadvantages.

It is another object of the present invention to provide a new and improved vehicle accessory holder with a gooseneck shaft which may be easily and efficiently manufactured and marketed.

It is further object of the present invention to provide a new and improved vehicle accessory holder with a gooseneck shaft which is of durable and reliable constructions.

An even further object of the present invention is to provide a new and improved vehicle accessory holder with a gooseneck shaft which is susceptible of a low cost of manufacture with regard to both materials and labor, and which accordingly is then susceptible of low prices of sale to the consuming public, thereby making such vehicle accessory holder with a gooseneck shaft economically available to the buying public.

Still yet another object of the present invention is to provide a new and improved vehicle accessory holder with a gooseneck shaft which provides in the apparatuses and methods of the prior art some of the advantages thereof, while simultaneously overcoming some of the disadvantages normally associated therewith.

Still another object of the present invention is maneuvering the gooseneck shaft of the apparatus to position a vehicle accessory in a desired location.

Lastly, it is an object of the present invention to provide a new and improved vehicle accessory holder with a gooseneck shaft adapted for use in association with a vehicle having a passenger cab with a floor board and at least one accessory item, the apparatus comprising: a gooseneck shaft formed in an elongated generally cylindrical configuration with an upper end and a lower end, the gooseneck shaft being semirigid and flexible to permit maneuvering of the shaft within the cab of a vehicle, upper and lower mounting brackets being coupled to the upper and lower ends of the shaft; a lower semirigid shock absorbing plate being coupled to the upper mounting bracket; a ridged upper mounting plate being coupled to the lower semirigid shock absorbing plate; and a plurality of hook and loop coupling strips, at least one strip being adhesively coupled to the rigid upper mounting plate, each accessory item including at least one strip being adhesively coupled thereto, in an operative orientation an accessory being coupled upon the upper rigid plate with the hook and loop coupling strips being coupled together to retain the accessory upon the upper plate.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts through the various Figures.

DESCRIPTION OF THE PREFERRED EBODIMENT

Figures 1, 2, 3:
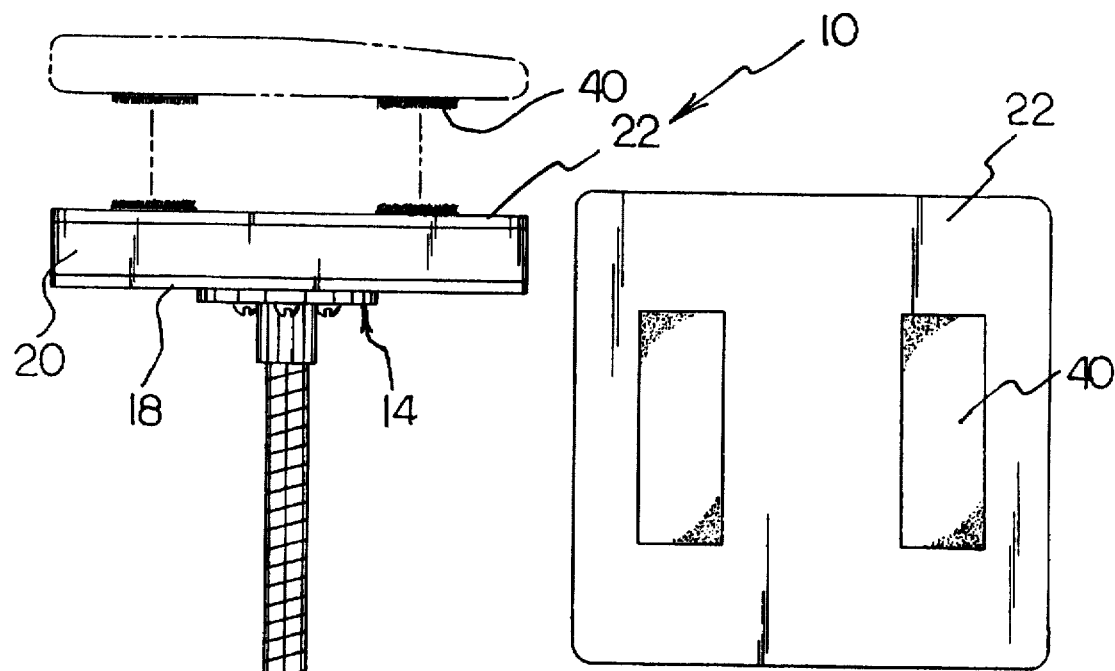
FIG. 1 is a perspective view of the preferred embodiment of the vehicle accessory holder with a gooseneck shaft constructed in accordance with the principles of the present invention.
FIG. 2 is a top perspective view of the ridged upper the hook & loop coupling strips. mounting plate of the apparatus illustrating the positioning of FIG. 3 is a top perspective view of the central semiridged shock absorbing plate of the apparatus.

With reference now to the drawings, and in particular to FIG. 1 thereof, the preferred embodiment of the new and improved vehicle accessory holder with a gooseneck shaft embodying the principles and concepts of the present invention and generally designated by the reference numeral 10 will be described.

The present invention, the vehicle accessory holder with a gooseneck shaft 10 is comprised of a plurality of components. Such components in their broadest context include a gooseneck shaft 12, upper and lower mounting brackets 14, 16, a lower semirigid shock absorbing plate 18, a central semirigid shock absorbing plate 20 and a rigid upper mounting plate 22. Such components are individually configured and correlated with respect to each other so as to attain the desired objective.

The vehicle accessory holder with a gooseneck shaft 12 is adapted for use in association with an automotive vehicle having a passenger cab with a floor board and at least one accessory item. A sample of the types of accessory items the apparatus may be used with include the following: portable compact disc holders and players, cassette players, portable telephones, portable facsimile machines, radar detectors, cup holders, lap top computers, electronic organizers, children's travel games, dictaphones and tape recorders. In alternate embodiments the apparatus may utilized with other types of vehicles such as trucks, boats recreational vehicles and wheelchairs.

More specifically, the gooseneck shaft 12 is formed in an elongated generally cylindrical configuration with an upper end 24, a lower end 26 and a central extent therebetween. The shaft in about 20½ inches in height and ⅝ inch in diameter. The upper and lower ends of the shaft are solid to permit secure coupling within the mounting brackets of the apparatus. The central extent is formed as a plurality of contiguously formed coils 28 arranged in a looped orientation. The coils seperate slightly when the shaft is moved in different directions. The semirigid coiled construction of the shaft permits maneuvering of the shaft to various locations within the cab of a vehicle. When leaving the vehicle unattended the shaft and accessory item are shifted to a concealed location such as under the seat of the vehicle. The shaft is maneuvered to an easily reachable location when operating the vehicle. Note FIG. 1.

Figure 4:
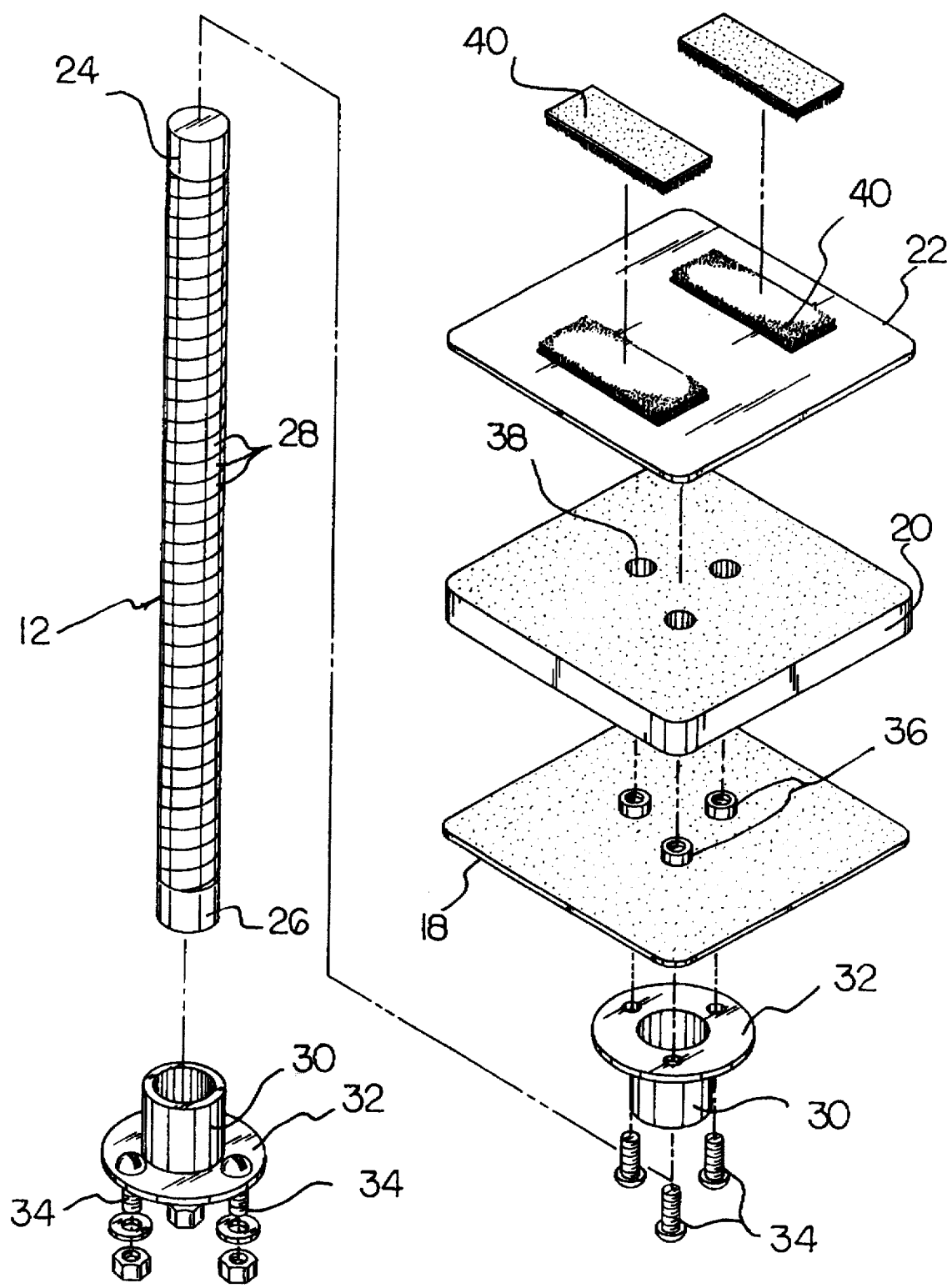
FIG. 4 is a separated perspective view illustrating the positioning of the various components of the apparatus with respect to each other.

The upper 14 and lower 16 mounting brackets each include a cylindrical coupling member 30 and a circular shaped base member 32 with three bolt holes. The lower mounting bracket is adapted to be coupled to the floor board of a vehicle with a plurality of bolts 34. In alternate embodiments washers, aircraft type nylon nuts and sheet metal screws are utilized to secure the apparatus to the floor board of a vehicle. The lower end of the gooseneck shaft is coupled within the lower mounting bracket. The upper bracket is coupled to the upper end 24 of the gooseneck shaft. Note FIGS. 1 and 4.

A lower semirigid shock absorbing plate 18 is formed in a planar generally rectangular configuration with three centrally positioned bolt holes. The lower, central and upper plates have rounded edges to prevent injury to users. The lower plate has an upper surface which includes cylindrical bolt supports 36 with internal bolt threads. The bolt supports are positioned around the bolt holes. A plurality of bolts 34 couple the lower plate to the upper mounting bracket 14. The bolts extend through the bolt supports in the coupled orientation to permit coupling within the upper rigid plate of the apparatus. Note FIG. 4.

The central semirigid shock absorbing plate 20 is formed in a planar generally rectangular configuration with a greater thickness than the lower semirigid plate. The semirigid surface is fabricated of elastomeric materials in the preferred embodiment. The central semirigid plate has a plurality of centrally positioned bolt holes 38 extending through it. The central plate is positioned upon the upper surface of the lower plate such that the bolt supports of the lower plate extend through the central plate. This configuration serves to loosely couple the lower and central shock absorbing plates together so that both plates function independently to absorb vibration. Note FIGS. 1-4.

A rigid upper mounting plate 22 formed in a planar generally rectangular configuration with an upper surface and a lower surface. A plurality of bolts are positioned through the lower and central semirigid plates and are coupled within the lower surface of the rigid upper mounting plate. The rigid surface is fabricated of plastic in the preferred embodiment to provide a firm and secure resting surface for an vehicle accessory item. Note FIGS. 1 and 2.

A plurality of hook and loop coupling strips 40 are included with the apparatus. VELCRO hook and loop materials are utilized in the preferred embodiment. At least one strip is adhesively coupled to the upper surface of the rigid mounting plate. Each accessory item includes at least one strip coupled to its lower surface. In an operative orientation an accessory item is coupled upon the upper rigid mounting plate with the hook and loop coupling strips coupled together to retain the accessory upon the upper plate. The accessory item is then easily maneuvered throughout the cab of the vehicle by the driver or one or more passengers. Note FIG. 1.

Figure 5:
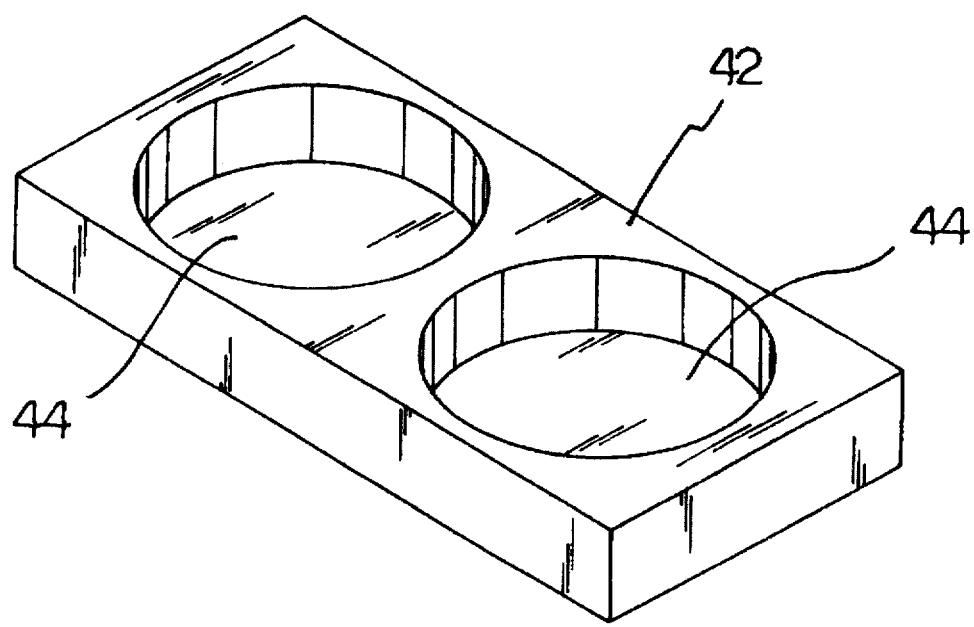
FIG. 5 is a perspective view of the cup holder of the apparatus.

A cup holder 42 is formed in a generally rectangular configuration with an upper surface and a lower surface. The upper surface includes two generally cylindrical shaped recesses 44 extending within it. The cup holder has at least two hook and loop coupling strips affixed to its lower surface. In an operative orientation the cup holder is coupled to the upper plate of the apparatus. The cup holder is adapted to hold accessories such as beverage cups in an operative orientation. Note FIG. 5.

Figure 6:
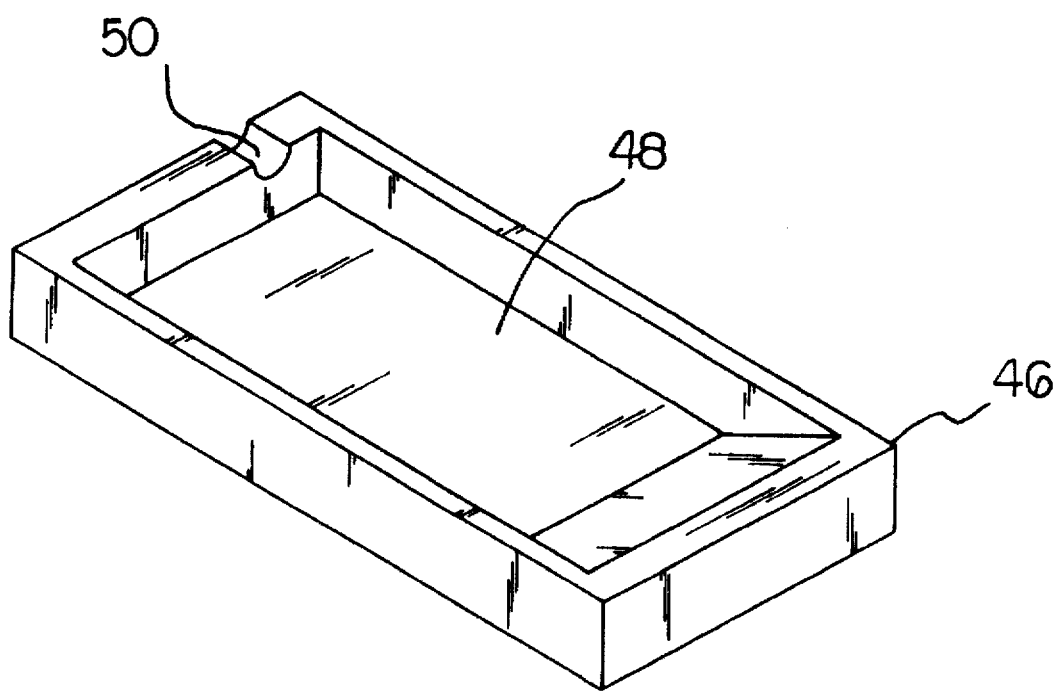
FIG. 6 is a perspective view of the electronic device holder of the apparatus.

An electronic device holder 46 is formed in a generally rectangular configuration with an upper surface and a lower surface. The upper surface includes a generally rectangular shaped recess 48 extending within it. The electronic device holder has a first side edge which includes a semicircular notch 50 positioned within it to permit the passage of an electronic device electrical plug. In an operative orientation the electronic device holder includes adhesive strips affixed to its lower surface to couple it to the upper rigid plate of the apparatus. The electronic device holder is adapted to securely retain a plurality of different types of electronic vehicle accessories. Note FIG. 6.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A new and improved vehicle accessory holder with gooseneck shaft adapted for use in association with a vehicle having a passenger cab with a floor board and at least one accessory item, the apparatus comprising, in combination:

a gooseneck shaft formed in an elongated generally cylindrical configuration with an upper end, a lower end and a central extent therebetween, the upper and lower ends of the shaft being solid, the central extent being formed as a plurality of contiguously formed coils arranged in a loop orientation, the gooseneck shaft being semirigid and flexible to permit maneuvering of the shaft to various locations within the cab of a vehicle;

upper and lower mounting brackets each including a cylindrical coupling member and a circular shaped base member with a plurality of bolt holes, the lower mounting bracket adapted to be coupled to the floor board of a vehicle with a plurality of bolts, the lower end of the gooseneck shaft being coupled within the lower mounting bracket, the upper bracket being coupled to the upper end of the gooseneck shaft;

a lower semirigid shock absorbing plate formed in a planar generally rectangular configuration with three centrally positioned bolt holes, the plate having an upper surface including cylindrical bolt supports with internal bolt threads, the bolt supports being positioned around the bolt holes, three bolts coupling the lower plate to the upper mounting bracket;

a central semirigid shock absorbing plate fabricated of elastomeric material and formed in a planar generally rectangular configuration with a greater thickness than the lower semirigid plate, the central semirigid plate having a plurality of centrally positioned bolt holes extending therethrough, the central plate being positioned upon the upper surface of the lower plate such that the bolt supports thereof extend through the central plate;

a rigid upper mounting plate fabricated of plastic and formed in a planar generally rectangular configuration with an upper surface and a lower surface, a plurality of bolts being positioned through the lower and central semirigid plates and being coupled within the lower surface of the rigid upper mounting plate, the plates being coupled together to permit shock absorption;

a plurality of hook and loop coupling strips, two strips being adhesively coupled to the upper surface of the rigid mounting plate, each accessory item including two strips being adhesively coupled thereto, in an operative orientation an accessory being coupled upon the upper surface of the rigid mounting plate with the hook and loop coupling strips being coupled together to retain the accessory upon the upper plate;

a cup holder formed in a generally rectangular configuration with an upper surface and a lower surface, the upper surface including two generally cylindrical shaped recesses extending therein, in an operative orientation the cup holder having two hook and loop coupling strips affixed to the lower surface and couplable to the upper plate of the apparatus, the cup holder adapted to hold accessories such as beverage cups in an operative orientation; and an electronic device holder formed in a generally rectangular configuration with an upper surface and a lower surface, the upper surface including a generally rectangular shaped recess extending therein, the electronic device holder having a first side edge including a semicircular recess positioned therein to permit the passage of an electronic device electrical plug therethrough, in an operative orientation the electronic device holder including hook and loop coupling strips affixed to the lower surface and couplable to the upper rigid plate of the apparatus, the electronic device holder adapted to securely retain a plurality of different types of electronic vehicle accessories.

* * * * *